May 18, 1965   E. M. DETERS   3,183,723
LEAK DETECTOR
Filed Dec. 19, 1962   3 Sheets-Sheet 1

Inventor
Elmer M. Deters
By
McCanna, Morsbach & Pillote
Attorneys

May 18, 1965  E. M. DETERS  3,183,723
LEAK DETECTOR
Filed Dec. 19, 1962  3 Sheets-Sheet 2
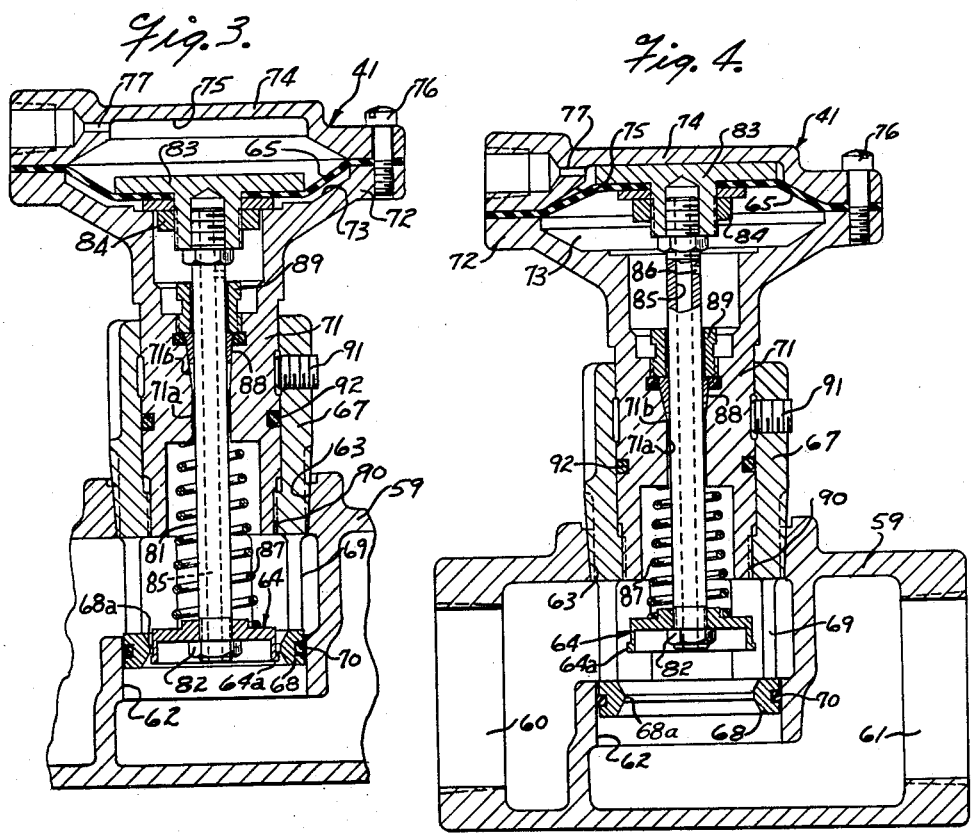
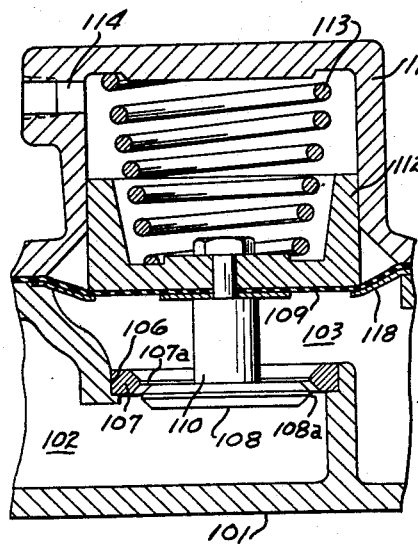
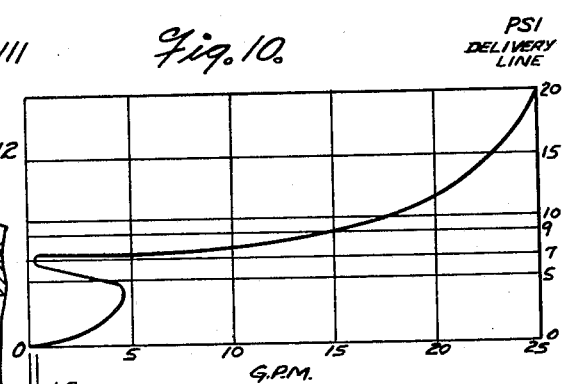

May 18, 1965  E. M. DETERS  3,183,723
LEAK DETECTOR
Filed Dec. 19, 1962  3 Sheets-Sheet 3
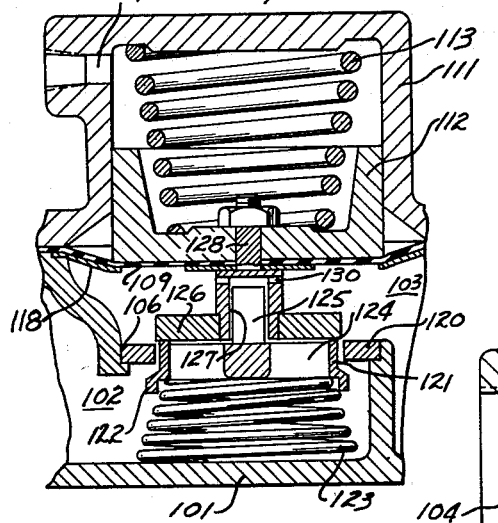
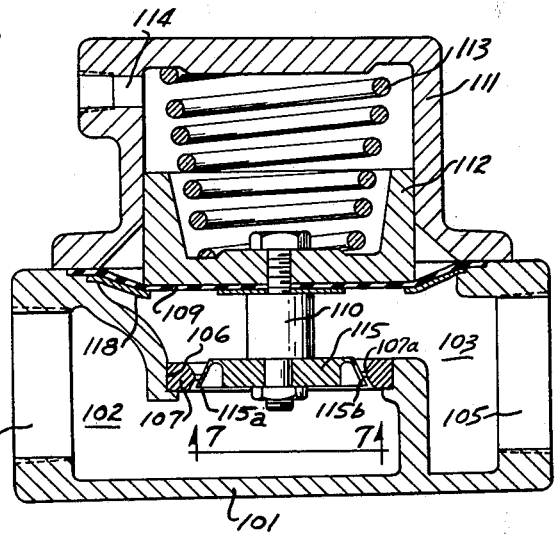
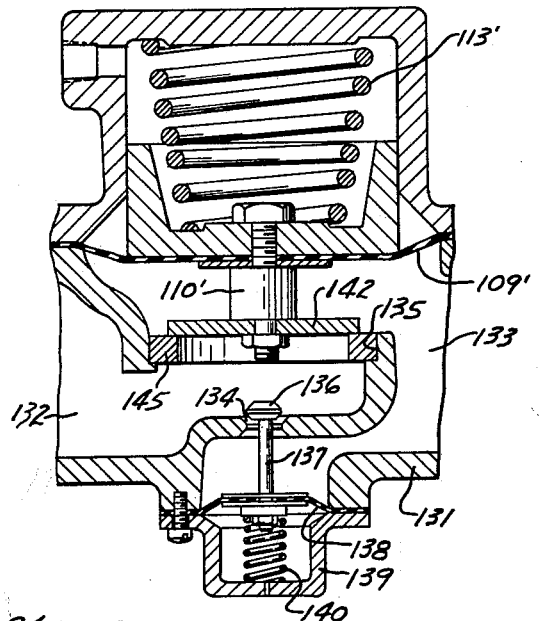
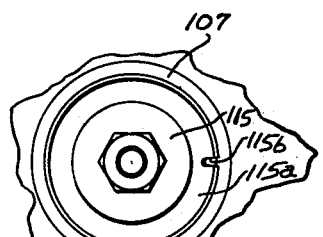
Inventor
Elmer M. Deters
By
McCanna, Morsbach & Pillote
Attorneys United States Patent Office 3,183,723
Patented May 18, 1965

3,183,723
LEAK DETECTOR
Elmer M. Deters, Davenport, Iowa, assignor to Red Jacket Manufacturing Co., Davenport, Iowa, a corporation of Iowa
Filed Dec. 19, 1962, Ser. No. 245,733
21 Claims. (Cl. 73—40.5)

This invention relates to improvements in leak detecting apparatus.

The present invention is particularly directed to an apparatus for detecting leaks in a fluid delivery line through which fluid is intermittently delivered under pressure, for example, a pumping system for use in gasoline service stations wherein the pump is intermittently operated to deliver gasoline under pressure to a delivery line to one or more valved outlets located at a remote dispensing pedestal. In such installations, the fluid in the line is under pressure during dispensing and, if there is a significant leak in the line, continued leakage over a prolonged period may produce a dangerous accumulation of gasoline in the ground around the line. The detection of leaks from the delivery line, however, is complicated by the fact that the pressure in the line varies over a wide range in normal operation of the system. The pressure will rise to full pump delivery pressure when the pump is operated and the outlet valve is closed, and the pressure will decrease somewhat when the outlet valve is opened. When the pump is stopped, the pressure in the line will also change even in the absence of a leak from the line. Thus, the pressure will decrease in the line when the pump is stopped, due to contraction of the liquid in the line with changes in temperature or due to leakage of the valve in the pump or at the inlet end of the line. Further, opening of the outlet valve when the pump is stopped can also cause the line pressure to decrease to atmospheric pressure.

An important object of this invention is to provide an apparatus for detecting leaks from a delivery line through which fluid is intermittently delivered under pressure and which apparatus will discriminate between changes in pressure in the line which occur due to other causes such as contraction of liquid in the line or leakage of the pump or the valves at the inlet end of the line.

Another object of this invention is to provide an apparatus for detecting leaks from a line through which fluid is intermittently delivered under pressure, and which apparatus will prevent full flow through the line in the event of a leak from the line to signal the operator of the existence of the leak in the line.

Another object of this invention is to provide a leak detecting apparatus which will prevent full flow through the line in the event of a leak, and which will not cause any significant delay in delivery from the line in the event of loss in pressure in the line for causes other than leaks from the line.

Yet another object of this invention is to provide a leak detecting apparatus which is of simple construction and which is reliable in operation.

Still another object of this invention is to provide an improved arrangement for mounting the leak detecting apparatus in a pumping system to facilitate repair and replacement of the leak detector.

An additional object of this invention is to provide an apparatus for detecting leaks from a delivery line through which fluid is intermittently delivered under pressure, and which is operative when a leak is detected to allow flow through the line but at a reduced rate substantially below full normal flow, to thereby avoid requiring immediate shut down of the dispensing system.

These, together with other objects and advantages of this invention will be more readily appreciated as the same becomes better understood by reference to the following detailed description when taken in connection with the accompanying drawings wherein:

FIGS. 3 and 4 are fragmentary sectional views of the leak detector of FIG. 2 mounted on a different casing and illustrating different moved positions of the leak detector;

FIG. 5 is a fragmentary sectional view through a modified form of leak detecting apparatus;

FIG. 6 is a fragmentary sectional view through a further modified form of leak detecting apparatus;

FIG. 7 is an end view of the valve member taken on the plane 7—7 of FIG. 6;

FIG. 8 is a fragmentary sectional view through still another form of leak detecting apparatus;

FIG. 9 is a fragmentary sectional view through yet another form of leak detecting apparatus; and FIG. 10 is a graph illustrating the relationship between the flow opening in the leak detector valve, expressed in terms of gallons per minute and the pressure in the line, when the pump is started after a period of shutdown.

Figure 1:
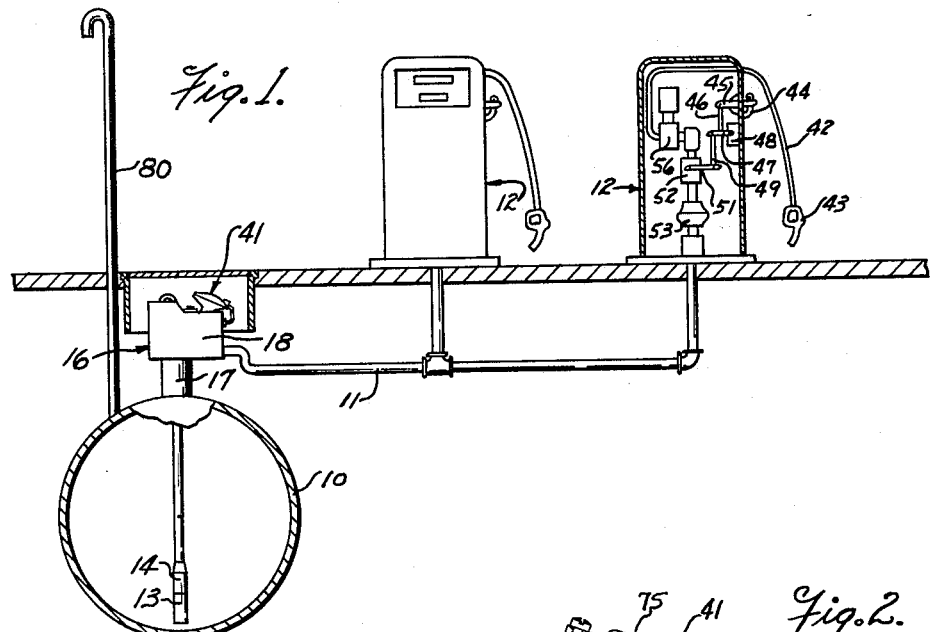
FIG. 1 is a diagrammatic view of a service station installation having a leak detecting apparatus of the present invention applied thereto.

The leak detecting apparatus of the present invention is generally adapted for use in detecting leaks from a delivery line through which fluid is intermittently delivered under pressure, and is herein shown and described in conjunction with a gasoline dispensing system for use in service stations and the like. Such an installation is diagrammatically illustrated in FIG. 1 and includes an underground tank 10 for storing a quantity of gasoline and a delivery line 11 for delivering gasoline from the tank to one or more pedestals 12. A pump and motor 13, 14 herein shown of the submersible type, is provided in the tank for pumping gasoline from the tank to a delivery line 11 to pedestals. While the outlet of the pump may be connected to the delivery line in any desired manner, a below grade discharge unit 16 is advantageously employed to facilitate removal of the pump and motor from the tank for service and repair. The discharge unit 16 includes a casing 17 attached to the tank and extending upwardly therefrom, and a discharge head or manifold 18 mounted on the upper end of the casing 17. The casing 17 and discharge head define an internal passage which extends from the tank to a point adjacent ground level, and which has an internal opening larger than the cross section of the pump and motor 13 and 14 to enable insertion and withdrawal of the pump and motor therethrough. The discharge head also has an outlet chamber 19 and a lateral outlet opening 21 which is connected to the delivery line 11. A removable adapter unit or packer 24 is mounted in the discharge head and has a downwardly facing inlet opening 26 connected to a drop pipe 27 which supports the motor-pump unit in the tank. The packer also has an outlet 28 which is adapted to communicate with the outlet chamber in the discharge head, and which is sealed to the discharge head as by a gasket 29. The packer defines a flow passage for interconnecting the inlet opening 26 with the outlet opening 28 and which flow passage includes an inlet chamber 31, an intermediate chamber 32 and an outlet chamber 33. A port 34 in the packer communicates the inlet chamber with the intermediate chamber and a check valve 36 is provided for controlling flows through the port. The check valve is arranged to open for flow from the inlet chamber 31 to the intermediate chamber 32 and is yieldably urged to its closed position by a spring 37, to prevent return flow. The packer is detachably supported on the discharge head and is sealed thereto as by an O-ring 39. The packer can thus be removed from the discharge head to withdraw the pump and motor from the tank for service and repair.

Figure 2:
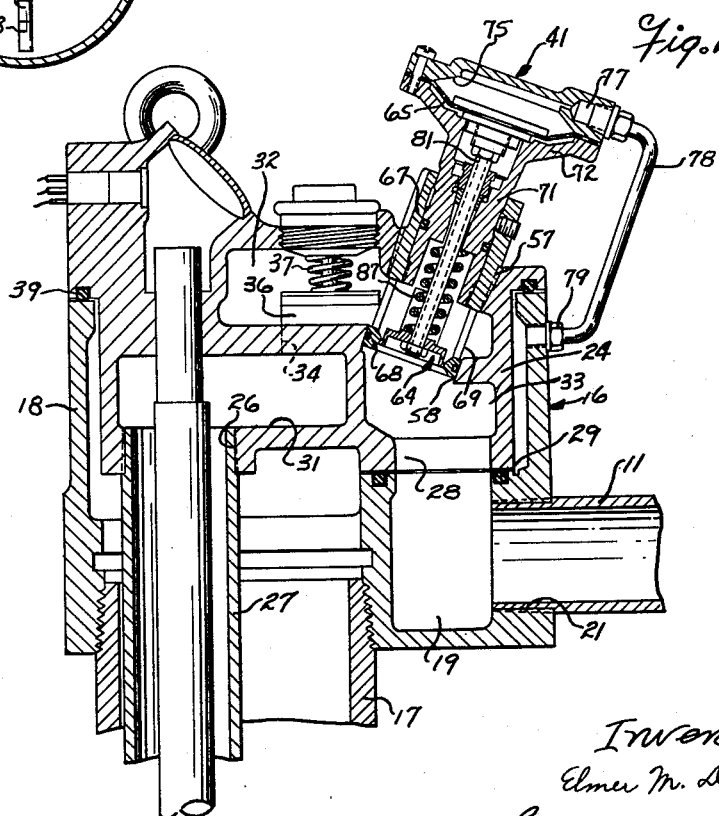
FIG. 2 is a sectional view through a below grade discharge unit used in the pumping system and having the leak detecting apparatus of the present invention mounted thereon.

When the pump is operating, the fluid in the delivery line is under pressure. Any significant leak in the line can, over a prolonged period, cause a dangerous accumulation of gasoline in the ground surrounding the line. A leak detecting apparatus 41 is provided for detecting any leaks in excess of a preselected rate from the line, and for preventing full flow through the line in the event a leak is detected to thereby signal the operator as to the presence of the leak. In the embodiment of FIGS. 1 and 2, the leak detector is advantageously mounted on the packer 24 to simplify the installation of the system, to facilitate service and repair of the leak detector, and detect any leaks which may occur at any point between the outlet 28 of the packer and the remote dispensing pedestal 12.

A valve mechanism is also provided at the pedestals 12 and so arranged as to be closed when the pump is stopped to thereby normally maintain the delivery line 11 under pressure. As shown herein, the delivery line at each of the pedestals is connected to a delivery hose 42 having a conventional normally closed nozzle valve 43 at the outlet end thereof, and which nozzle valve is manually operable to its open position to permit dispensing of gasoline. The pedestal 12 also includes a conventional nozzle support 44 and a switch lever 45 which extends over the nozzle support. The switch lever is connected through a link 46 to the operating lever 47 of the pump control switch 48 and is also connected through a link 49 to the operating lever 51 of an interlock valve 52. The interlock valve is of conventional construction and is disposed in the supply line leading to the hose 41 and is normally closed, the interlock valve being opened in response to movement of the switch lever 45 to a position to close the pump control switch 48. A check valve 53 is also commonly used in the delivery line either before or after the inlet lock valve, and a meter 56 is provided in the delivery line for measuring the quantity of gasoline passing therethrough.

When the nozzle valve 43 is closed to stop the dispensing of liquid, the pump 13 continues to operate until the nozzle is hung on the support 44 to operate the switch 48 and stop the pump. During this time, the pump delivers fluid under pressure to the delivery line and the pressure in the line builds up to maximum delivery pressure. The check valve 36 at the discharge head then closes to prevent return flow and to tend to maintain the pressure in the delivery line. The pressure in the delivery line 11 between the check valve 36 and the nozzle 43 will obviously decrease if there is a leak in the delivery line. However, the pressure in the delivery line will also decrease for other causes such as thermal contraction due to changes in ambient temperature; a leak in the check valve 36 at the discharge head, or if the nozzle valve 43 is opened when the pump 13 is not in operation. The leak detecting apparatus 41 is arranged to detect a leak in the delivery line and to discriminate against changes in pressure due to the other causes mentioned above. The leak detecting apparatus is advantageously so arranged as to prevent full flow through the delivery line, in the event a leak is detected, so as to thereby signal the operator of the presence of the leak. In the embodiment shown in FIGS. 1 and 2, the leak detecting apparatus is mounted on the packer 24 to simplify installation of the system, facilitate service and repair of the leak detector, and to also adapt the leak detector to not only detect leaks in the delivery line but also detect any leakage which may occur at the junction between the packer outlet 28 and the outlet chamber 19 in the discharge head.

As shown in FIGS. 1 and 2, the leak detector 41 is mounted in a threaded opening 57 in the top of the packer 24 and controls the flow through a port opening 58 in the packer between the intermediate chamber 32 and the outlet chamber 33. The leak detector 41 shown in FIGS. 3 and 4 is the same as that shown in FIGS. 1 and 2, except that the leak detector of FIGS. 3 and 4 is mounted in a casing 59 separate from the packer and manifold. The casing 59 has an inlet 60 and an outlet 61 and is adapted for connection in the delivery line 11 adjacent the outlet 21 of the manifold. The casing 59 has a port opening 62 intermediate the inlet and outlets 60 and 61 and a threaded side opening 63 for receiving the leak detector. Since the leak detector construction is the same, like numerals are used to designate the same parts of the leak detector in FIGS. 1–4.

The leak detector 41 in general includes a valve member 64 for controlling flow through the port opening and a pressure responsive operator 65 for moving the valve member. The pressure responsive operator is responsive to the pressure at the outlet side of the valve 64 and is operative to move the valve member to a position throttling flow through the port opening when the pump is stopped and the pressure in the delivery line decreases, for any reason, to a relatively low value. In accordance with the present invention, the leak detector is so arranged as to effect rapid resetting of the valve 64 to an open position for full flow through the line when the pump is restarted, if the decrease in pressure in the delivery line was produced by causes other than leakage from the line, and to prevent full delivery to the line if the decrease in pressure was due to leakage in excess of a preselected rate from the line which rate is hereinafter referred to as the maximum permissible leakage rate. In a gasoline dispensing system of the type shown, the switch 48 is usually operated at the time of removal of the nozzle from its support 44 so that the pump is started a short time interval before the nozzle is positioned in the automobile tank opening and opened. The leak detector is arranged to effect resetting of the leak detector valve in a very short time, of the order of two or three seconds, if there is no significant leak from the line, so as to avoid delay in delivery through the nozzle 43.

Referring more specifically to FIGS. 2–4, the leak detector includes a tubular body 67 conveniently threaded into the opening 57 or 63 in the packer 24 or casing 59 respectively. An annular seat 68 is advantageously formed integrally with the body 67 for accurate alignment of the seat with the body, and is connected to the body by apertured section 69. The seat is arranged to project into the port opening 58 or 62 in the packer and casing 59 respectively, and an O-ring 70 is mounted in a groove in the outer periphery of the annular seat to seal the seat to the port opening. As will be noted, the annular seat extends around the valve member 64 and protects the same during insertion or removal of the leak detector.

A stem guide member 71 is mounted in the tubular body 67 and has a flange 72 on its upper end. The pressure responsive operator 65, herein shown in the form of a flexible diaphragm, overlies the flange 72 and defines an operator chamber 73 at one side of the diaphragm. A cap 74 overlies the other side of the diaphragm and defines an operator chamber 75 therewith. The cap 74 is clamped to the periphery of the diaphragm and to the flange 72 as by fasteners 76. The chamber 75 at the upper side of the diaphragm is vented to atmosphere and, conveniently, has a vent opening 77 which is connected as by a conduit 78 and fitting 79 to the discharge head 18 in the portion thereof which is in open communication with the tank 10. The tank 10 is, in turn, vented through the usual standpipe 80 (FIG. 1).

A valve stem 81 is attached to the valve member 64, as by threaded engagement therewith, and lock nut 82 is provided for locking the valve member on the stem. The other end of the stem is attached to the diaphragm 65 by a fitting 83 and a nut 84. In this embodiment, the pressure responsive operator 65 is located adjacent the inlet side of the seat 68 and the operator chamber 73 at the underside of the diaphragm is isolated from the pressure at the inlet opening by the stem guide member 71. The fluid pressure at the outlet side of the seat 68, that is the fluid pressure in the line 11 is applied to the underside of the diaphragm and, for this purpose, the stem 81 is formed with an axial passage 85 and a lateral opening 86 that communicates the chamber 73 with the pressure at the outlet side of the seat.

The valve member 64 is yieldably urged axially by a spring 87 to a position as shown in FIG. 3 spaced axially from the seat 68 at one side thereof, when the pressure in the delivery line 11 drops below a preselected pressure. As the pressure in the delivery line increases, to an intermediate pressure, the pressure responsive operator 65 moves the valve member from the position shown in FIG. 3 to an intermediate position in which the valve member 64 spans the seat 68. When the pressure in the delivery line rises above the intermediate pressure, the pressure responsive operator moves the valve member to an open position such as shown in FIG. 4 in which the valve member is spaced axially from the other side of the seat. The seat 68 is advantageously formed with a tapered cross section defining a relatively narrow edge 68a, and the valve member 64 is also preferably formed with a peripheral lip 64a which is adapted to engage the edge 68a and form a seal thereacross when the valve member is in its intermediate position spanning the seat. Provision is made for passing a restricted flow of fluid from the inlet to the outlet, when the valve member is in its intermediate position, at a rate which is equal to the maximum permissible leakage rate in the delivery line. In the form shown in FIGS. 2–4, this leakage rate is controlled by a by-pass formed between the valve stem 81 and the stem guide member 71. The clearance between the stem and the bore 71a of the stem guide member is made very small, of the order of a few thousandths, so as to restrict the flow between the stem and the guide bushing to a rate substantially equal to the maximum leakage rate in the system. This by-pass is advantageously made adjustable for control of the leakage rate to be detected, and for this purpose, the bore 71a is formed with a tapered portion 71b and a tapered bushing 88, of a deformable material such as brass, is adapted to be pressed in the tapered portion by a gland 89 threaded on the stem guide member. The bushing is formed to have an initial clearance around the stem to allow a controlled flow of fluid therebetween, and the bushing can be pressed inwardly to constrict this flow by tightening the gland 89. The fluid that flows through the restricted passage between the stem and stem guide enters the operator chamber 73 but is discharged therefrom into the delivery line 11 through the passage 85 in the valve stem. The passage 85 is made much larger than the restricted passage between the stem and guide to maintain the pressure in the chamber 73 at the pressure in the delivery line.

The leak detecting apparatus 41 operates to detect a leak when the pump is started after a period of shut down, and after the pressure in the system has dropped to a relatively low value, such as atmospheric pressure. In normal operation, the delivery nozzle 43 is removed from the support 44 and the switch 48 is operated to start the pump at least a few seconds before the nozzle is put into the automotive filler opening and opened. During this interval, the pump begins to deliver fluid under pressure to the delivery line 11. When the pressure at the outlet chamber 33 is below a preselected range, for example below five pounds per square inch as shown in the graph in FIG. 10, the valve member 64 is spaced from the seat a distance to permit flow therethrough at a rate substantially higher than the leakage rate to be detected, to rapidly build up the pressure in the delivery line 11 to the intermediate pressure range. In this regard, the spacing between the valve member and the seat, when the valve member is in its initial position shown in FIG. 3, is selected so as to provide a flow through the seat which is substantially greater than the maximum permissible leakage rate, but which is yet well below the normal flow delivery rate. For example, the spacing can be selected so as to provide a flow rate of the order of two, three, four or five gallons per minute, which flow rate is substantially above the maximum permissible leakage rate indicated by the dimension LR in FIG. 10, and substantially less than the full delivery rate, which may be of the order of twenty five gallons per minute or more. When the pressure at the outlet chamber 33 increases to an intermediate pressure of about five pounds per square inch, the pressure responsive operator 65 begins to move the valve member 64 upwardly to the intermediate position spanning the seat 68. In this position, the valve member spans the seat, and liquid flows through the by-pass between the stem and stem guide and through the passage 85 to the outlet chamber. If the rate of leakage from the delivery line is in excess of the rate of flow through this by-pass, then the valve member will not move further to its fully open position. However, if the leakage rate from the system is less than the rate of flow through the by-pass, then the pressure in the outlet chamber 33 will rapidly increase sufficient to move the valve member to its fully open position. As soon as the valve member begins to move away from the seat toward its fully open position, the pressure in the delivery line builds up to full pump discharge pressure and, similarly, the pressure at the underside of the diaphragm 65 rapidly increases to effect rapid opening of the valve member. When the nozzle valve is thereafter opened for dispensing, the pressure in the line at the leak detector drops somewhat. However, the intermediate pressure range at which the valve member moves past the seat 68 is selected to be somewhat below the pressure that the pump will maintain under full flow conditions, to prevent reclosing of the leak detector during dispensing. On the other hand, if the leak detector does not move to its open position before the nozzle valve is opened, then the pressure in the line will decrease and the valve member will move back toward its FIG. 3 position. In this position, the valve allows a throttled flow, for example, of the order of two to five gallons per minute, which is just sufficient to permit continued operation of the system and avoid a complete shutdown but which will yet make it very inconvenient to continue operation under these conditions for a prolonged time without correcting the leak. It is sometimes desirable to adjust the flow which the leak detector will pass in the event the valve fails to open due to the presence of a leak. As shown in FIGS. 2 and 3, the stem guide member 71 is threadedly adjustable, as indicated at 90, relative to the tubular body 67 to adjust the initial position of the valve member relative to its seat. The stem guide member is locked in its adjusted position by a set screw 91 and an O-ring 92 is provided for sealing the stem guide member to the body 67.

By using a narrow edged seat 68a and a valve member having a narrow edge or rim 64a, the actual change in pressure required to move the valve member through its intermediate position can be made relatively small, of the order of one or two p.s.i. Thus, the leak detector operates to detect the presence of a leak after the pump is started, but only during a relatively narrow pressure range which is intermediate the lowest pressure which occurs in a system and full pump delivery pressure. The leak detector allows the pressure in the line to rapidly build up this intermediate pressure and, at the time, passes a restricted flow of fluid to the line correlative with the maximum permissible leakage rate. If the leakage from the line is less than the flow through the leak detector, the pressure in the line rapidly builds up above the intermediate range and the leak detector moves to its fully open position. Since the range of pressures during which the leak is detected is very narrow, the leak detector valve will reset to its open position in a very short time, of the order of three to five seconds, if there is no leakage from the line. The leak detector valve will therefore reset in the normal time interval between the starting of the pump and opening of the dispensing valve. As will be seen, the leak detector 41 is adapted for mounting in the opening 57 in the packer or, alternatively the opening 57 can be plugged, and the leak detector mounted in a casing 59 in the delivery line 11.

The leak detectors illustrated in FIGS. 5, 6, 7 and 8 are similar in construction, but employ different types of valve members and seats and like numerals are used to designate the same parts. The leak detectors each include a casing 101 having an inlet chamber 102 and outlet chamber 103. The inlet end of the casing has an inlet opening 104 adapted for connection as by threaded engagement with the pipe leading to the outlet 21 of the discharge head, and the outlet opening 105 in the casing is adapted for connection to the delivery line 11 leading to the remote dispensing pedestals. A port opening 106 in the casing communicates the inlet and outlet chambers and has a seat 107 extending therearound. A valve member 108 controls flow through the port and a fluid pressure operator 109 is connected to the valve through a stem 110 to operate the valve member.

In these embodiments, the fluid pressure operator 109 is located at the outlet chamber side of the seat 107 and as shown, the operator comprises a diaphragm which overlies one side of the outlet chamber, and which is clamped thereto as by a cap 111. A diaphragm reinforcing plunger 112 is slidably supported in the cap and a spring 113 is disposed between the cap and the plunger to yieldably urge the valve downwardly to the position shown in FIG. 5. The chamber in the cap is vented to atmosphere and, for this purpose, the chamber has a vent passage 114. A stop 118 is preferably provided to limit movement of the valve member beyond the position shown in FIG. 5, when the pressure in the line drops to a low value. The operation of this leak detector is similar to that previously described. When the pressure at the outlet chamber 103 is below a preselected intermediate range, for example below five to seven pounds, the valve member is positioned as shown in FIG. 5, and permits relatively rapid flow past the seat to rapidly increase the pressure in the line to the intermediate pressure range. When the pressure at the outlet reaches the intermediate range, the diaphragm is moved upwardly against the bias of the spring 113 and moves the valve member to a position spanning the seat. A by-pass is provided for passing liquid from the inlet to the outlet when the valve is in its intermediate position, at a rate equal to the maximum permissible leakage rate. In the form shown in FIG. 5, the valve member 108 is dimensioned slightly smaller than the seat 107 so as to permit the aforementioned restricted flow therebetween, when the valve member spans the seat. If the leakage from the delivery line is less than the flow between the valve and seat, when the valve is in its intermediate position, then the pressure in the delivery line will rapidly build up above the intermediate pressure range and move the valve member to its fully open position. The seat 107 is preferably tapered to form a sharp edge 107a and the valve member is similarly formed with a tapered rim 108a so that the valve member spans the seat only during a relatively narrow pressure range.

A leak detector having a slightly modified form of valve is illustrated in FIGS. 6 and 7. This leak detector is the same as that illustrated in FIG. 5, except for the construction of the valve member, and like numerals are used to designate corresponding parts. The valve seat 107 is advantageously tapered from both sides as shown in FIG. 6 to provide a relatively sharp edge 107a. The valve member, designated 115, is formed with a resilient peripheral rim 115a, the outer diameter of which is slightly larger than the inner diameter of the seat 107a so that the valve member completely closes the seat, as it moves through the intermediate position. A by-pass, herein shown in the form of a small notch 115b is formed in the valve member to provide a restricted by-pass through the valve member, when the latter is in its intermediate position.

A further modified form of leak detector is illustrated in FIG. 8. This leak detector also has the same general construction and arrangement as that shown in the embodiment of FIG. 5, and like numerals are used to designate corresponding parts. This embodiment includes a valve seat 120 and two valve members. A first valve member 121 includes a generally annular body having an outer diameter smaller than the inner diameter of the seat 120 to form a flow passage therebetween. The spacing between the valve member and seat is selected so as to provide a flow therebetween substantially greater than the maximum permissible leakage rate to rapidly build up the pressure in the delivery line to a preselected value, but which flow is yet substantially below flow from the pump. The annular valve member 121 has an outwardly extending flange portion 122 which is adapted to engage the seat 120 when the valve member moves upwardly, to block flow between the valve member and seat. A spring 123 is provided for yieldably urging the valve member upwardly.

The valve member 121 has openings 124 extending therethrough and a central upwardly extending stem guide pin 125. A second valve member 126 has a hollow stem 127 slidably supported on the stem guide pin 125 and a reduced diameter extension 128 which is connected to the fluid operator 109. The valve member 126 is yieldably urged downwardly by the spring 113 into seated engagement with the valve member 121, to block flow through the openings 124. The spring 113 is made stronger than the spring 123 and, when the pressure in the chamber 103 is below a preselected intermediate pressure, for example from five to seven pounds, the spring 113 pushes the valve member 126 downwardly to also depress the valve member 121, as shown in FIG. 8. When the pump is initially started, fluid can flow relatively rapidly between the valve member 121 and the seat 120, to rapidly increase the pressure in the delivery line to the intermediate pressure range. At that time the intermediate pressure operating on the diaphragm 109 moves the diaphragm and valve member 126 upwardly until the valve member 121 seats against the seat 120 and interrupts flow between the valve member and the seat. The stem guide pin 125 and the hollow stem 127 are formed with a clearance of the order of a few thousandths of an inch therebetween to provide a restricted flow passage for passing fluid at a rate equal to the maximum permissible leakage rate, and this fluid is passed through lateral passage 130 in the hollow stem 127 into the outlet chamber 103. If there is no leakage from the delivery line, the pressure in the delivery line will increase above the intermediate range and move the diaphragm 109 upwardly to open the valve member 126.

In the leak detector of FIG. 9, the casing designated 131 has inlet and outlet chambers 132 and 133 and first and second port openings 134 and 135 intermediate the inlet and outlet chambers, a first valve member 136 controls flow through port 134 and is attached by a stem 137 to a fluid pressure responsive diaphragm 138. The diaphragm 138 has one side exposed to the fluid pressure in the outlet chamber 133 and is clamped to the casing 131 by a vented cap 139. The valve member 136 is yieldably urged to an open position at the inlet chamber side of the seat 134 by a spring 140 and the spring 140 and diaphragm 138 are selected and arranged so that the diaphragm will move the valve member to a position spanning the seat 134 when the pressure at the outlet chamber rises to a preselected intermediate value, such as the aforedescribed five to seven p.s.i. The valve member 136 is made slightly smaller than the seat 134, of the order of a few thousandths of an inch, to pass a restricted flow therebetween equal to the maximum permissible leakage rate when the valve member spans the seat and, advantageously, the seat and valve member are tapered so that the valve member spans the seat only over a relatively narrow range of pressures. A second valve member 142 controls flow through the port opening 135 and is normally urged by the spring 113' to a position engaging the valve seat 145 and closing the port opening. A diaphragm 109' is connected to the valve stem 110' and is proportioned with relation to the spring 113' to open the valve member 142 for full flow through the leak detector when the pressure at the outlet chamber 133 rises above the intermediate pressure range at which the valve member 136 spans its seat 134.

From the foregoing it is thought that the operation and construction of the several embodiments will be readily understood. As diagrammatically illustrated in FIG. 10, the leak detector valves allow relatively rapid flow therethrough into the delivery line, when the pressure in the line is below the intermediate pressure range, and the pressure in the delivery line builds up rapidly to the intermediate pressure. At that time, the leak detector valve throttles the flow to the delivery line to a rate LR equal to the maximum permissible leakage rate from the delivery line. If fluid does not leak from the delivery line, at a rate in excess of the maximum permissible leakage rate, the pressure will build up in the delivery line and the pressure responsive operator will then move the valve to its open position. If there is a leak in the delivery line in excess of the rate of flow permitted through the leak detector when the valve member is in its intermediate position, the valve member will not move to its open position. Instead, the leak detector will operate to permit a reduced flow to the outlet. This signals the operator as to the presence of a leak, but yet permits the operator to dispense gasoline, if necessary, but at a very reduced rate.

I claim:

1. The method of detecting leakage in excess of a preselected leakage rate from a fluid delivery line through which fluid is intermittently pumped under pressure and wherein the pressure in the line may vary over a wide range between full pump delivery pressure when the pump is operating and a relatively low pressure when the pump is stopped, said method comprising delivering fluid to the line at a rate in excess of said leakage rate until the pressure in the line reaches an intermediate pressure range between said low pressure and said relatively higher delivery pressure, throttling the flow to the delivery line to said preselected leakage rate when the pressure in the line reaches said intermediate pressure range, and supplying full flow to the delivery line if the fluid flowing at said preselected leakage rate into the line increases the pressure in the line above said intermediate pressure range.

2. The method of detecting leakage in excess of a preselected leakage rate from a fluid delivery line having an outlet flow control valve comprising, closing the outlet flow control valve, delivering fluid under pressure to the line at a point remote from the outlet valve and at a rate in excess of said leakage rate to build up the pressure in the line, throttling the flow of liquid to the line to said preselected leakage rate when the pressure in the line builds up to an intermediate pressure range below full pump pressure and above atmospheric pressure, and thereafter supplying full flow to the line only if the fluid flowing at said preselected leakage rate into the line increases the pressure in the line above said intermediate pressure range.

3. The method of detecting leakage in excess of a preselected leakage rate from a fluid delivery line having an outlet flow control valve adjacent one end of the delivery line and pump means adjacent the other end of the delivery line comprising, closing the outlet flow control valve and starting the pump means, throttling the flow from the pump means to the delivery line to a rate less than full flow through the line and greater than said leakage rate when the pressure in the line is below an intermediate pressure range between atmospheric and full pump pressure, thereafter throttling the flow to the delivery line to said preselected leakage rate when the pressure in the line reaches said intermediate pressure range, and thereafter supplying full flow from the pump to the delivery line only if the fluid flowing into the delivery line at said preselected rate increases the pressure in the line above said intermediate pressure range.

4. An apparatus for detecting leakage in excess of a preselected leakage rate from a fluid delivery line through which fluid is intermittently delivered under pressure and wherein the pressure in the line can vary over a wide range between a low pressure and a relatively higher delivery pressure, said apparatus comprising, a casing having an inlet and an outlet adapted to pass fluid therethrough to the delivery line, pressure responsive valve means intermediate said inlet and outlet for controlling flow between said inlet and said outlet and operative to restrict flow from said inlet to said outlet to said preselected leakage rate when the pressure in the line reaches a preselected intermediate range between said low pressure and said delivery pressure, said pressure responsive valve means being operative when the pressure in the line drops below said intermediate range to open sufficient to provide flow between said inlet and outlet substantially in excess of said preselected rate, said pressure responsive valve means being operative to open for substantially full flow therethrough only when the pressure in the line rises above said intermediate range.

5. An apparatus for detecting leakage in excess of a preselected leakage rate from a fluid delivery line through which fluid is intermittently delivered under pressure and wherein the pressure in the line can vary over a wide range between a low pressure and a relatively higher delivery pressure, said apparatus comprising, a casing having an inlet and an outlet adapted to pass fluid therethrough to the delivery line, pressure responsive valve means intermediate said inlet and outlet for controlling flow between said inlet and said outlet and operative to open for flow from the inlet to the outlet at a rate substantially greater than said leakage rate when the pressure in the line is below an intermediate pressure range between said low pressure and said delivery pressure; to restrict flow from the inlet to the outlet to said leakage rate when the pressure in the line is in said intermediate range; and to open for substantially full flow between the inlet and outlet when the pressure in the line rises above said intermediate range.

6. An apparatus for detecting leakage in excess of a preselected rate from a fluid delivery line through which fluid is intermittently delivered under pressure and wherein the pressure in the line can vary over a wide range between a low pressure and a relatively higher delivery pressure, said apparatus comprising a casing having an inlet and an outlet adapted to pass fluid therethrough to the delivery line, valve means intermediate said inlet and outlet controlling flow therethrough, means responsive to the pressure in said line for positioning the valve means at an initial position when the pressure in the line is below a preselected intermediate pressure range between said low pressure and said delivery pressure, said pressure responsive means being operative to move said valve means to an intermediate position when the pressure in the line is in said intermediate range and to an open position when the pressure in the line is above said intermediate range, said valve means being operative in said initial position to pass fluid from said inlet to said outlet at a rate substantially in excess of said preselected rate, said apparatus including means operative when said valve means is in said intermediate position for passing fluid at said preselected rate from said inlet to said outlet to increase the pressure at said outlet if the leakage from said line is less than said preselected rate, said valve means being operative in said open position to pass substantially full flow from said inlet to said outlet.

7. An apparatus for detecting leakage in excess of a preselected rate from a fluid delivery line through which fluid is intermittently delivered under pressure and wherein the pressure in the line varies over a wide range between a low pressure and a relatively higher delivery pressure, said apparatus comprising a casing having an inlet and an outlet adapted to pass fluid therethrough to the delivery line, a valve port intermediate said inlet and outlet, valve means cooperable with said port for controlling flow between said inlet and said outlet, means responsive to the pressure at said outlet for positioning said valve means at an initial position when the pressure at the outlet is below a preselected intermediate pressure range between said low pressure and said delivery pressure, said pressure responsive means being operative to move said valve means to an intermediate position when said pressure at said outlet is in said preselected intermediate range and to an open position when the pressure at said outlet is above said preselected intermediate range, said valve means being operative in said initial position to pass fluid through said port at a rate substantially greater than said preselected rate to rapidly build up the pressure in the line to said preselected intermediate range, leakage rate control means including said valve means operative when said valve means is in said intermediate position to throttle flow through said port and pass fluid at said preselected rate from said inlet to said outlet to increase the pressure at said outlet only if the leakage from the line is less than said preselected rate, said valve means being operative in said open position to pass full flow from the inlet to the outlet.

8. The combination of claim 7 wherein said leakage rate control means comprises a loose fit between said valve means and said port when said valve means is in said intermediate position.

9. The combination of claim 7 wherein said leakage rate control means comprises a groove in the interengaging faces of said valve means and said port.

10. An apparatus for detecting leakage in excess of a preselected rate from a fluid delivery line through which fluid is intermittently delivered under pressure and wherein the pressure in the line varies over a wide range between a low pressure and a relatively higher delivery pressure, said apparatus comprising a casing having an inlet and an outlet adapted to pass fluid therethrough to the delivery line, a valve port intermediate said inlet and outlet, valve means cooperable with said port for controlling flow between said inlet and said outlet, means responsive to the pressure at said outlet for positioning said valve means at an initial position when the pressure at the outlet is below a preselected intermediate pressure range between said low pressure and said delivery pressure, said pressure responsive means being operative to move said valve means to an intermediate position when said pressure at said outlet is in said preselected intermediate range and to an open position when the pressure at said outlet is above said preselected intermediate range, said valve means being operative in said initial position to pass fluid through said port at a rate substantially greater than said preselected rate to rapidly build up the pressure in the line to said preselected intermediate range, said valve means being operative in said intermediate position to substantially close said port and define an opening with said port sufficient to pass fluid therethrough at said preselected rate, to increase the pressure in the line if the leakage therefrom is less than said preselected rate, said valve means being operative in said open position to pass full flow from the inlet to the outlet.

11. An apparatus for detecting leakage in excess of a preselected rate from a fluid delivery line through which fluid is intermittently delivered under pressure and wherein the pressure in the line varies over a wide range between a low pressure and a relatively higher delivery pressure, said apparatus comprising a casing having an inlet and an outlet adapted to pass fluid therethrough to the delivery line, a valve port intermediate said inlet and outlet, valve means cooperable with said port for controlling flow between said inlet and said outlet, means responsive to the pressure at said outlet for positioning said valve means at an initial position when the pressure at the outlet is below a preselected intermediate pressure range between said low pressure and said delivery pressure, said pressure responsive means being operative to move said valve means to an intermediate position when said pressure at said outlet is in said preselected intermediate range and to an open position when the pressure at said outlet is above said preselected intermediate range, said valve means being operative in said initial position to pass fluid through said port at a rate substantially greater than said preselected rate to rapidly build up the pressure in the line to said preselected intermediate range, said valve means being operative in said intermediate position to at least substantially close said port, means defining a restricted passage communicating said inlet and said outlet when said valve means is in said intermediate position for passing fluid at said preselected rate from the inlet to the outlet whereby to increase the pressure in the line if the leakage from the line is less than said preselected rate, said valve means being operative in said open position to pass full flow from the inlet to the outlet.

12. An apparatus for detecting leakage in excess of a preselected rate from a fluid delivery line through which fluid is intermittently delivered under pressure and wherein the pressure in the line varies over a wide range between a low pressure and a relatively higher delivery pressure, said apparatus comprising, a casing having an inlet chamber and an outlet chamber and a valve seat intermediate said chambers, a valve member movable from an initial position spaced axially from the seat at one side thereof through an intermediate position spanning said seat and an open position spaced axially from the seat at the other side thereof, a pressure responsive operator connected to said valve member and having one side exposed to fluid pressure at said outlet chamber and the other side exposed to atmospheric pressure, means yieldably urging said valve member to said initial position, said operator having an area sufficiently greater than the area of said seat to move said valve member from said initial position to said intermediate position when the pressure in said outlet chamber reaches a preselected intermediate pressure range less than said delivery pressure and greater than said low pressure, said valve member when in said initial position being spaced from said seat a distance sufficient to allow flow through the seat at a rate much greater than said preselected rate whereby to rapidly increase the pressure in the delivery line to said intermediate pressure range when fluid under pressure is delivered to the inlet chamber, leakage rate control means operative when the valve is in said intermediate position for passing fluid from the inlet chamber to the outlet chamber at said preselected rate whereby to increase the pressure in the delivery line above said intermediate range if the leakage from the line is less than said preselected rate, said pressure responsive means being operative to move said valve member to its open position when the pressure at the outlet chamber exceeds said intermediate range to provide full flow.

13. The combination of claim 12 wherein said fluid pressure responsive means is located at the side of said seat adjacent said inlet chamber, said fluid pressure responsive means including a stem connected to said valve member, means including guide means on said casing slidably engaging said stem and defining an operator chamber at said one side of the pressure responsive means separate from said inlet chamber, and passage means communicating said operator chamber with said outlet chamber.

14. The combination of claim 13 wherein said leakage rate control means comprises a restricted flow passage between said stem and said guide means to pass fluid at said preselected rate from said inlet chamber to said operator chamber, said passage means having a flow area greater than said restricted flow passage to pass the fluid from the operator chamber to said outlet chamber and to maintain the pressure in the operator chamber at the pressure in said outlet chamber.

15. The combination of claim 14 wherein said passage means is formed in said stem.

16. The combination of claim 14 including means for adjusting the clearance between the flow passage and the guide means to adjust the minimum rate of flow between the inlet and outlet.

17. An apparatus for detecting leakage in excess of a preselected leakage rate from a fluid delivery line through which fluid is intermittently delivered under pressure and wherein the pressure in the line varies over a wide range between full pump delivery pressure and relatively low pressure, said apparatus comprising a casing having an inlet and an outlet adapted to pass fluid therethrough to the delivery line, first and second pressure responsive valve means intermediate said inlet and outlet for controlling flow between said inlet and outlet, said first valve means being operative to open for flow from the inlet to said outlet at a rate substantially greater than said leakage rate when the pressure in the line is below an intermediate pressure range between full pump delivery pressure and above atmospheric pressure, said first valve means being operative to move to a position restricting flow from the inlet to the outlet to said leakage rate when the pressure in the line is in said intermediate range, said second valve means being normally closed and operative to open for substantially full flow between the inlet and outlet when the pressure in the line rises above said intermediate range.

18. An apparatus for detecting a leak in excess of a preselected leakage rate from a fluid delivery line through which fluid is intermittently delivered under pressure and wherein the pressure in the line can vary over a wide range between a low pressure and a relatively higher delivery pressure, said apparatus comprising a casing having an inlet and an outlet adapted to pass fluid to the delivery line, said casing having a port opening between said inlet and outlet and an opening at the side aligned with said port opening, a sleeve mounted in said opening in said side and having a valve seat attached thereto and spanning said port opening, a body mounted in said sleeve having a stem guide bore therein, a valve member cooperable with said seat and having a stem extending through said guide bore, a pressure responsive operator on the outer end of the stem, means on said body defining first and second pressure chambers at opposite sides of said operator, means on said body for limiting movement of the valve member to an initial position disposed at one side of said seat for passing fluid at a rate in excess of said preselected rate through the seat, means for applying fluid pressure from the delivery line to the chamber at one side of said operator for moving said valve member to an intermediate position when the pressure in the line rises to an intermediate pressure range between said low pressure and said relatively higher delivery pressure, means operable when the valve is in said intermediate position for passing fluid at said leakage rate between the inlet and the outlet, said pressure responsive operator being operative when the pressure rises above said intermediate range to move said valve member to an open position at the other side of the seat.

19. The combination of claim 18 wherein said body is adjustable axially of said sleeve to adjust said initial position of said valve member.

20. In a pumping system including a delivery line, a flow control valve means at one end of the line for controlling flow therefrom, pump means at the other end of the line operable to intermittently deliver fluid under pressure to the line whereby the pressure in the line can vary from full pump delivery pressure when the pump is operating and the flow control valve is closed to a relatively low pressure when the pump is stopped due to the thermal contraction in the line, an apparatus for detecting leakage in excess of a preselected leakage rate from the line, said apparatus including pressure responsive valve means for controlling flow from the pump means to the line operative to open for flow from the pump to the line at a rate substantially greater than said leakage rate when the pressure in the line is below an intermediate pressure range between said low pressure and full pump delivery pressure; to restrict flow from the pump means to the line to said leakage rate when the pressure in the line is in said intermediate pressure range; and to open for substantially full flow from the pump means to the line when the pressure in the line rises above said intermediate range.

21. In a pumping system, the combination of a pitless underground discharge unit including a manifold adapted for connection to a casing and having a lateral discharge outlet, a packer removably mounted in the manifold and having a downwardly facing inlet opening and an outlet opening registering with the outlet opening in the manifold and a flow passage communicating said inlet opening and said outlet opening, pump means connected to said inlet opening for pumping liquid thereto, a discharge line connected to said outlet opening, a leak detecting apparatus mounted on said packer for removal therewith, said leak detecting apparatus communicating with said passage between said inlet opening and outlet opening for detecting leakage from said line.

References Cited by the Examiner

UNITED STATES PATENTS 2,952,389   9/60   Fowler et al. _____ 73—40 X

ISAAC LISANN, *Primary Examiner.*